2,818,327
SELECTIVE WEED CONTROL BY PREVENTION OF VIABLE SEED PRODUCTION

George Knowles, Ottawa, Ontario, Canada

No Drawing. Application December 9, 1953
Serial No. 397,263

1 Claim. (Cl. 71—2.5)

The present invention relates to methods and compositions for selective weed control and more particularly to methods and compositions for preventing the production of viable seed.

It is an object of this invention to provide an effective and inexpensive method for preventing the production of viable seeds in undesirable plants.

It is a further object of the invention to provide compositions for the devitalization of seeds in undesirable plants.

Another object of the invention is to provide methods and compositions for preventing the spread and regrowth of undesirable plants by means other than killing the plants.

"Weed Control" applied in its broadest sense includes any plant which is found growing out of place. Such plants are known as undesirable plants. Thus wild oats growing in a field of barley will decrease the yield and quality of the resultant barley crop.

Heretofore the emphasis in the field of weed control has been placed on the application of weed "killers" to undesirable plants in order to control their growth. Various expensive cultural and cropping methods of controlling undesirable plants have also been used. However, it has recently been discovered that certain compositions, if used in controlled amounts, will not kill a plant but will inhibit the growth of certain portions of the plant including the formation and devitalization of viable seeds. Unfortunately these growth inhibitors (as the compositions are commonly called) are only selective in certain combinations of desirable and undesirable plants. In many cases growth inhibitors are inapplicable since they affect both the desirable and undesirable plants at the same time when applied in the usual manner of weed control, for example they will not select between a grass weed and a grass crop.

The present invention overcomes these imperfections by the application of a method of weed control which allows a seed formation inhibitor to select between wanted and unwanted plants based on the time variance in their common growth stages. Firstly, it has been found that plants are susceptible to seed formation inhibitors in different degrees according to the stage of growth of the plant. At an earlier stage of growth of the plant it may be highly susceptible to a seed formation inhibitor whereas at a later stage in its growth it may be almost totally resistant to the same inhibitor. Secondly, it is well known that different varieties of plants progress at different time rates through stages of growth common to all of them. Thus for instance if two varieties are planted at the same time one variety will pass through the flowering stage and mature earlier than the other variety.

From the above disclosure it will be seen that, where a crop is planted which contains seeds of an undesirable plant, if the desirable plant matures at a rate faster than that of the unwanted plant, then a seed formation inhibitor applied to the crop soon after the desirable plant passes into the resistant stage of its growth will catch the undesirable plant in a susceptible growth stage and prevent the production of viable seed.

Further, applicant has found that certain known compositions may be used to devitalize seeds as well as inhibit their formation. Devitalized seeds appear externally normal but will not germinate.

Seeds in their various growth stages vary in their susceptibility and resistance to devitalization; as the seed matures it passes from a period of high susceptibility to a period of high resistance. Applying this phenomenon to the method of weed control outlined above, the range of susceptibility of plants to seed formation inhibitors will be lengthened and, most importantly, a much higher percentage of control will be obtainable.

It should be noted here that seed formation inhibition includes both imprisonment of the plant heads to prevent emergence and sterility of those heads which emerge and flower.

A specific example of the staggered growth method of weed control encompassed by this invention is the use of maleic hydrazide (1,2-dihydropyridazine-3,6-dione) on a crop of barley adulterated with wild oats. Prior to the present invention, control of wild oats was attained only by delayed seeding of barley preceded by cultivation to destroy the first spring growth of wild oats. Wild oats germinating at the same time and later than germination of the barley escaped such destruction. Recently certain herbicides with grass controlling properties were introduced, among them TCA (sodium trichloro acetate) and maleic hydrazide. However, the cost of TCA and the reduction in crop yield by the orthodox application of maleic hydrazide have discouraged their use.

The common growth stages of wild oats and of barley do not proceed in a parallel manner with respect to time. Barley matures at a rate faster than wild oats and if planted at the same time passes at an earlier date through each growth stage. The relevant common growth stages of both plants may be classified broadly in order as: (1) the shot blade stage, (2) the head stage, (3) the flowering stage, (4) the seed stage, which may be subdivided into (a) the milk stage and (b) the dough stage. Column 3 of Table I shows the relationship at given times during plant growth of the head, flower and seed stages of barley and wild oats planted at the same time.

As stated above, it has been found that certain compositions may be used as seed formation inhibitors and for seed devitalization. Maleic hydrazide is one of these compositions. To obtain seed formation inhibition and devitalization, the application of maleic hydrazide must be undertaken at certain stages in the plant's growth when the plant is susceptible to the composition. In wild oats and barley susceptibility to seed formation inhibition occurs in the shot blade, head and flowering stages and susceptibility to devitalization occurs in the milk seed stage. When wild oats and barley have passed into the dough seed stage they become resistant to seed formation inhibition and devitalization.

Table I shows the effect of maleic hydrazide applied during certain of the susceptible and resistant stages of wild oats and barley. By spraying with maleic hydrazide just after the barley has passed into the dough seed stage, a high percentage of wild oats will be sterilized and nearly all the remaining seed produced will be devitalized, since the wild oats will still be in the susceptible head, flower and milk seed stages.

It should be noted that the date on which the earliest wild oats will germinate (that is, those wild oats mixed in with the barley seeds) corresponds with the germination of the barley. Wild oats germinating later than this will be caught in the susceptible shot blade and head stages when spraying of the maleic hydrazide is carried out.

As stated above, it has been found that maleic hydrazide performs two functions when applied to plants. Its first and known function is to act as a seed formation inhibitor. In this function the maleic hydrazide prevents the production of seed by imprisoning the head of the plant and preventing it from emerging, or else by sterilizing the plant in the head or flower stages. A second function which has hitherto been unknown and has been applied by the inventor is to prevent the germination of seeds which have been produced by devitalizing them while they are still on the stalk.

The maleic hydrazide may be sprayed in any available form. In the example illustrated in Table I a diethanolamine salt of maleic hydrazide was used, having been added to a solution containing water and a wetting dispersing and emulsifying agent. The resultant solution was applied with a low volume sprayer. The water acted as a carrier and was used in a quantity sufficient to apply the maleic hydrazide to the area of experimentation.

This novel method of selective weed control can only be effective with respect to flowering plants growing from seed alone. Perennials would not be effectively controlled although an economic value would reside where it is desired to sell seeds and the vendor finds it impossible to separate the seeds of the undesirable plant from those of the desirable plant due to their similar size. In that case the seeds of the undesirable plants could be devitalized by the novel method of weed control before harvesting of the seed crop.

It should be noted again that, in the novel method of selective weed control, the undesirable plants are not killed; the method prevents the production of viable seeds either by sterility or by non-germination if seeds are produced.

*Table I*

| Date Applied | Rate of Active Ingredient of Maleic Hydrazide per Acre, pound | Growth Stages | | Percent Germination | |
| --- | --- | --- | --- | --- | --- |
| | | Wild Oats | Barley | Wild Oats | Barley |
| July 2 | ½ | 50% heads, 50% flower. | Soft Dough seed | 23.6 | 96 |
| | 1 | ---do--- | ---do--- | 25.7 | 94 |
| | 1½ | ---do--- | ---do--- | 20.1 | 92 |
| July 7 | ½ | Late flower and milk seed. | Dough seed | 3.8 | 91 |
| | 1 | ---do--- | ---do--- | 0.9 | 97 |
| | 1½ | ---do--- | ---do--- | 0.7 | 98 |
| July 10 | ½ | ---do--- | ---do--- | 0.6 | 99 |
| | 1 | ---do--- | ---do--- | 0.0 | 97 |
| | 1½ | ---do--- | ---do--- | 0.0 | 98 |
| Untreated Check | | | | 54.6 | 99 |

I claim:

A method of selective weed control to prevent the production of viable wild oat seeds in a barley crop, comprising applying maleic hydrazide to said crop immediately after said seeds of said barley have entered the dough stage of growth, the concentration of the active ingredient of said maleic hydrazide being between about ½ and 1½ pounds per acre.

References Cited in the file of this patent

UNITED STATES PATENTS 2,614,916   Hoffman et al. _____ Oct. 21, 1952

OTHER REFERENCES

"Agricultural Chemicals," January 1952, pages 40 to 43 and 111.

"Principles of Weed Control," by Ahlgren et al. (John Wiley and Sons, Inc., New York, 1951), pages 128 to 140.

"Literature Summary on Maleic Hydrazide," U. S. Rubber Co., February 1952, pages 7 and 10 to 12.